May 4, 1965  P. F. ORCHARD ETAL  3,181,293
FLUID FUEL BURNING EQUIPMENT

Filed March 1, 1962  5 Sheets-Sheet 1

Inventor
Peter Frederick Orchard
Michael Roy Williams
By
Bailey, Stephenson & Huettig
Attorneys

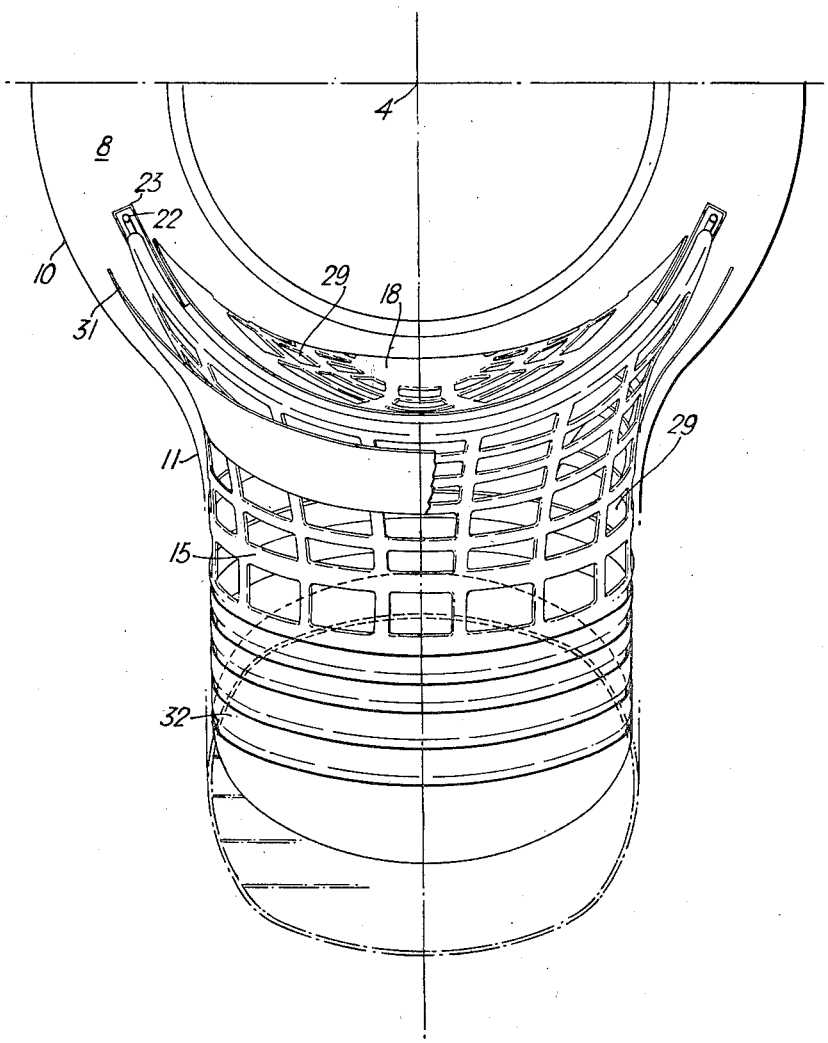

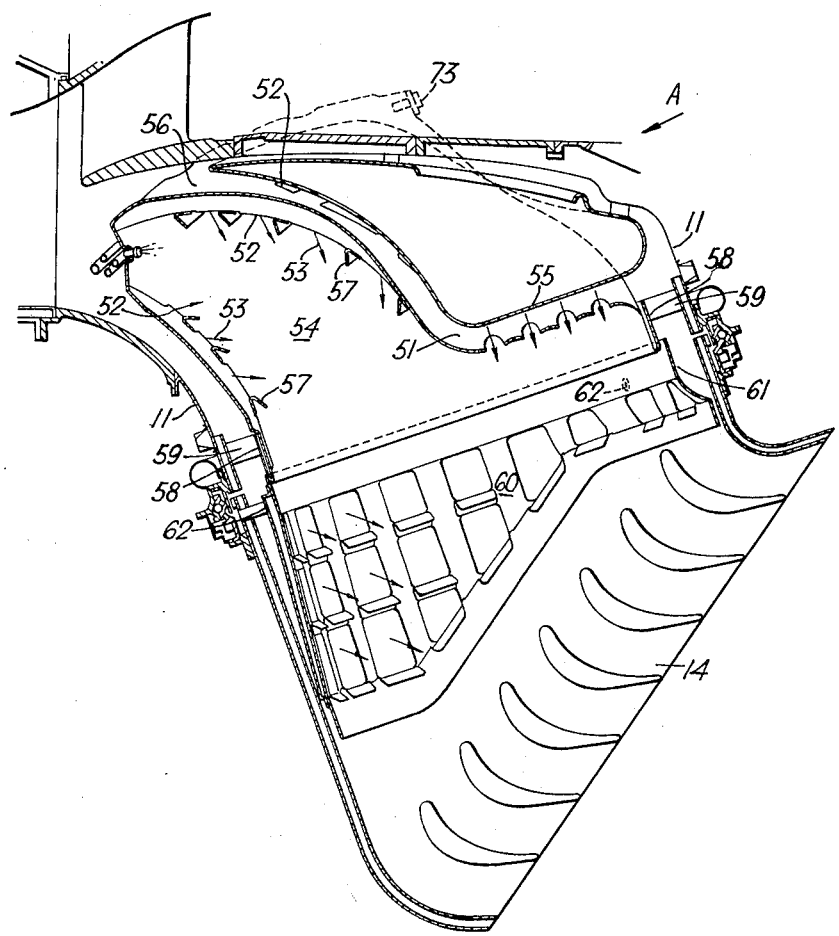

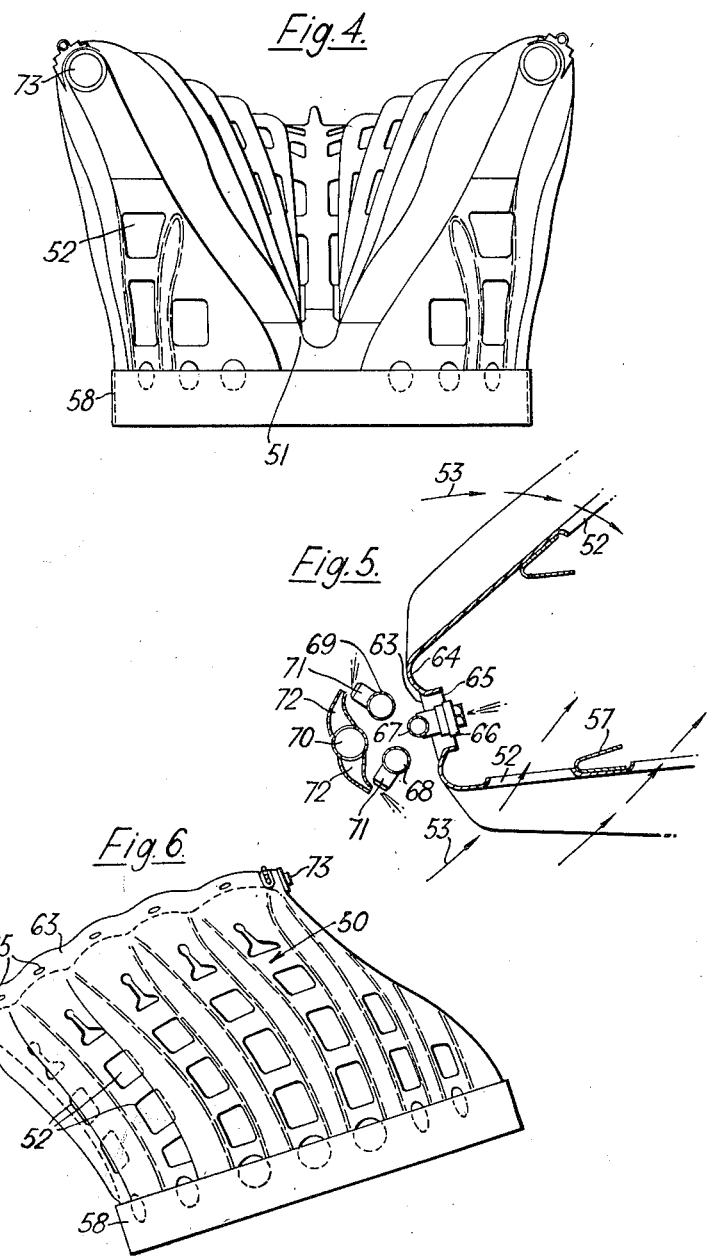

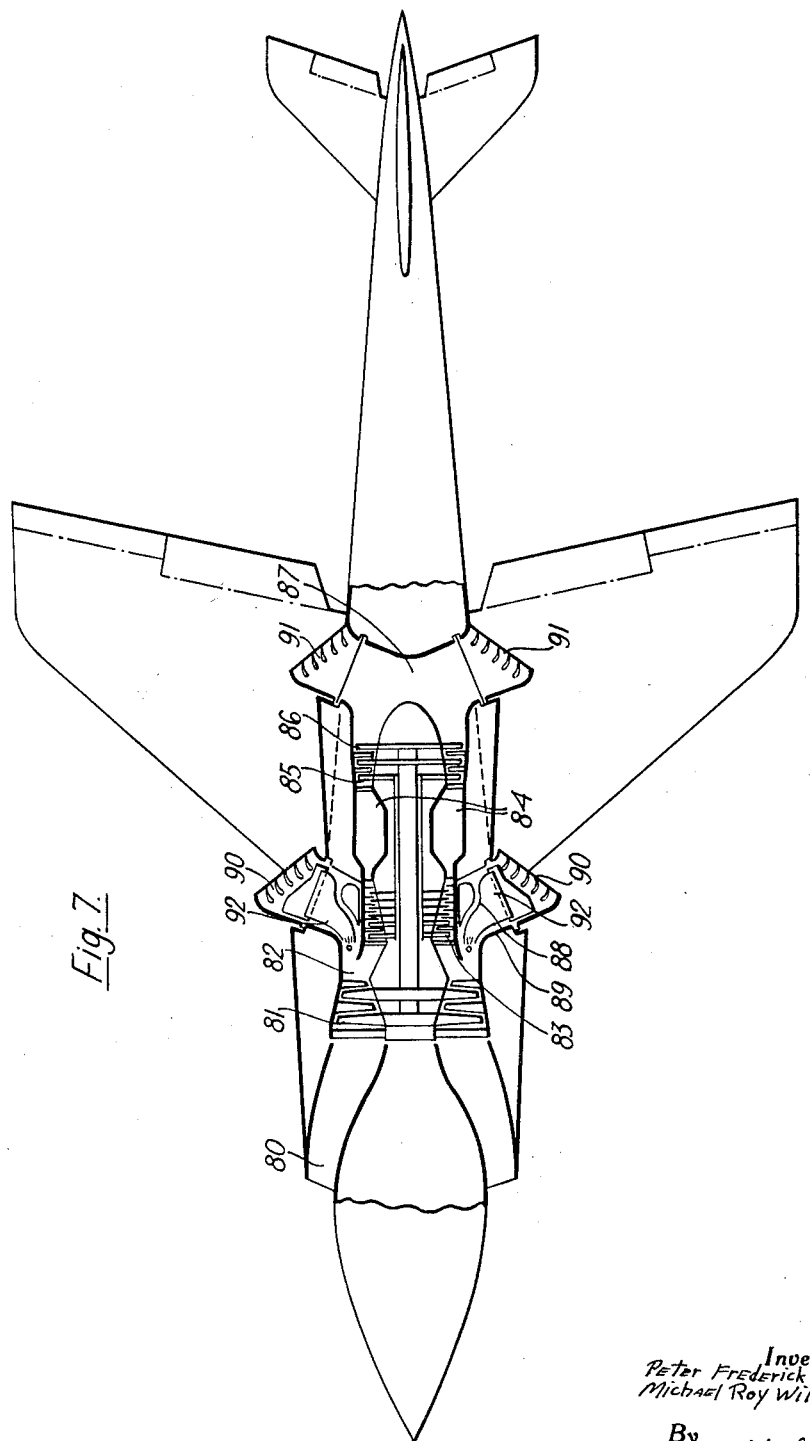

3,181,293
FLUID FUEL BURNING EQUIPMENT
Peter Frederick Orchard and Michael Roy Williams, Bristol, England, assignors to Bristol Siddeley Engines Limited, Bristol, England, a British company
Filed Mar. 1, 1962, Ser. No. 176,745
Claims priority, application Great Britain, Mar. 6, 1961, 8,094/61
10 Claims. (Cl. 60—35.55)

One form of aircraft jet propulsion power plant includes an axial flow air compressor arranged to deliver air to a passage extending outwards to an outlet carrying a swivelling nozzle. The nozzle serves to direct air to exert a thrust which, at the pilot's choice, may be directed forwards or upwards. To augment the thrust, for example at take-off, it is desirable to burn fuel in the air flowing from the compressor to the nozzle.

It is desirable, in order to minimise the frontal area of the aircraft, to keep the passage short; in fact a convenient form of passage is a chamber immediately downstream of the compressor, from which a stub duct, that is to say a duct having length less than its width, extends outwards. The chamber surrounds downstream parts of the power plant and is therefore arcuate in sections perpendicular to the axis of the compressor, and may indeed be a complete annulus. In other words the space enclosed by the chamber adjacent to the stub duct is saddle-shaped with an arcuate inlet at the front end.

The burning of the fuel requires means in the form of sprays and flame holders. According to the present invention this fuel burning means extends into both the stub duct and the chamber. In this way bulk and weight are kept to a minimum. The nozzle itself carries little or none of the fuel burning means, and the extension of the fuel burning means into the chamber enables the duct to be no longer than is required to locate the nozzle outside the fuselage or nacelle in which the power plant is housed.

The actual equipment according to the invention, for burning fluid fuel in a stream of combustion-supporting gas, may thus comprise: a casing including an inner wall and an outer wall together defining a saddle-shaped space having an arcuate inlet at one end, and a further wall defining an outlet duct extending outwards from the space, the further wall merging at its inner end with the outer wall and defining at its outer end a circular section outlet; a perforated liner within the casing having an inner wall spaced from the inner wall of the casing, an outer wall spaced from the outer wall of the casing, and a wall of generally circular section in and spaced from the wall of the outlet duct, the circular wall merging with the outer wall of the liner, and the inner and outer walls of the liner converging to an arcuate lip in the inlet end of the saddle-shaped space; and elongated fuel dispersing means upstream of and extending along and adjacent to the lip.

In operation, a mixture of the fuel and combustion supporting gas enters the liner through its perforations and burns inside the liner, the products of combustion leaving the liner by its open-ended part which lies within the outlet duct.

The accompanying drawings show two examples of equipment according to the present invention. Before detailed description of these examples, reference is made to FIGURE 7 which is a diagrammatic view from below of an aircraft to which the invention is applicable.

The aircraft has a jet engine including an air inlet 80, a low pressure compressor in the form of a ducted fan 81 with an outlet passage 82, a high pressure compressor 83, combustion chambers 84, a high pressure turbine 85, a low pressure turbine 86, and a jet pipe 87. Part of the air from the low pressure compressor outlet passage 82 enters the high pressure compressor 83, and the remainder enters a plenum chamber 88 around the high pressure compressor. This plenum chamber has two stub outlet ducts 89, each carrying a swivelling pipe bend nozzle 90. The jet pipe 87 is bifurcated and carries two further swivelling pipe bend nozzles 91.

For normal flight the nozzles 91 direct jet exhaust rearwards, and the nozzles 90 direct air rearwards. For vertical take-off or related manoeuvres the nozzles are all directed downwards, and fuel is burnt in the air flowing to the nozzles 90. In order to reduce the bulk and weight of the engine to a minimum, this burning, or the major part of it, takes place between the outlet passage 82 and the nozzles 90, that is to say in the plenum chamber 88 and its stub outlet duct 89. The position of the means for this burning is indicated at 92.

The remaining figures of the drawings relate to the detailed examples of equipment for burning fuel in gas in such a situation. FIGURES 3 to 6 are a refinement of FIGURES 1 and 2.

FIGURE 2 is a view looking on the liner in the downstream direction, the surrounding casing and outlet duct being indicated in ghost outline only.

FIGURE 3 is a section in a plane containing the axis of one outlet duct and the axis of the high pressure compressor;

FIGURE 4 is a view of the perforated liner of FIGURE 3 seen in the direction of the arrow A;

FIGURE 5 is a section to an enlarged scale through the leading edge of the liner to show more clearly the arrangement of the fuel manifolds;

FIGURE 6 is a side view of the liner; and

FIGURE 7 is a diagrammatic view from below of an aircraft to which the invention is applicable.

Figure 1:
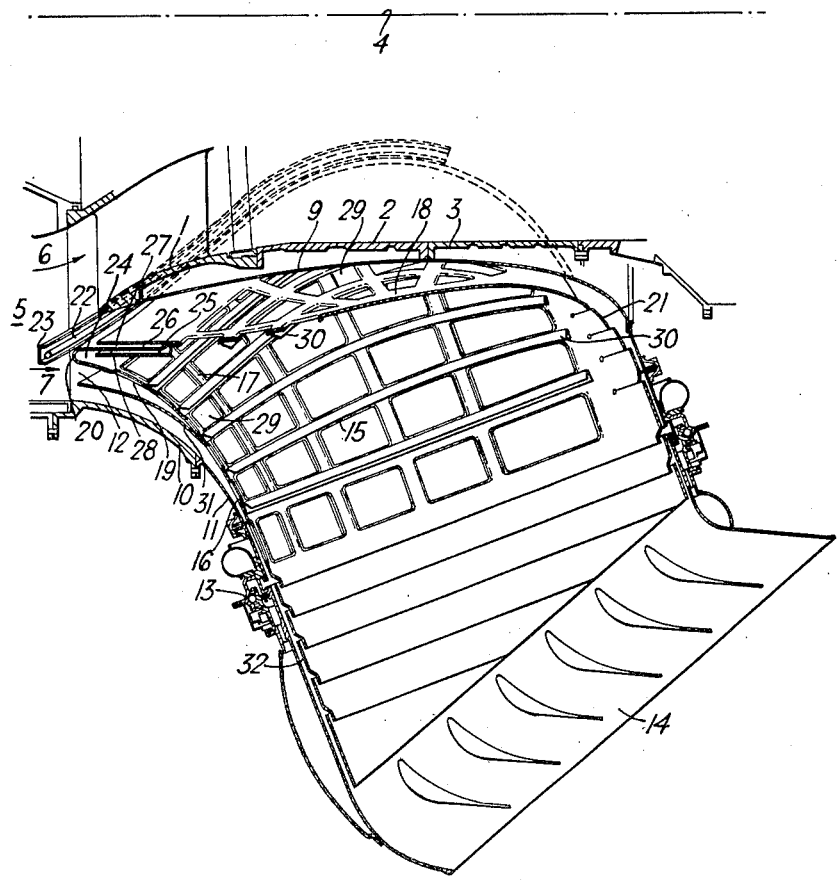
FIGURE 1 is a section through the combustion equipment and adjacent engine parts in a plane containing the axis of an outlet duct and the axis of the high pressure compressor.

The casing of the high pressure compressor comprises three parts 1, 2 and 3 with a common axis 4. Coaxially upstream of the compressor is a ducted fan, only the outlet passage 5 of which is shown. Part of the air discharged by the fan enters the intake of the compressor, as indicated by an arrow 6, and the remainder, indicated by an arrow 7, enters a plenum chamber 8 (see FIGURE 2) surrounding the casing of the compressor. The inner boundary wall of the plenum chamber is formed by a flared tubular member 9 constituting a fairing over the outside of the compressor casing, while the outer boundary wall 10 emerges into an outwardly projecting outlet duct 11 on each side of the engine, only one of the ducts being shown in the drawing. The plenum chamber may be annular both at its upstream and downstream ends, or only at its upstream end, the parts between the outlet ducts at the downstream end being eliminated. In either case the parts of the plenum chamber adjacent to each outlet duct straddle the compressor casing in the manner of a saddle, and the gap 12 between the outer wall 10 and the upstream edge of the part 1 of the compressor casing, which is a prolongation of the inner wall 9, constitutes an arcuate inlet.

Attached to the end of each outlet duct 11 by a swivel bearing 13 is a swivelling pipe bend nozzle 14.

For the purpose of burning fuel in the air supplied to the nozzles, when an increase in thrust is required, a perforated liner 15 is provided having a tubular part 16 arranged within and spaced from the wall of the outlet duct 11 and a saddle-shaped part 17 within and spaced from the walls 9 and 10 of the plenum chamber. The part 17 comprises an inner wall 18 and an outer wall 19 which converge to a lip 20 facing upstream at the inlet end of the casing. The lip-shaped formation extends round that part of the periphery of the inner wall 18 which is crossed by air flowing from the arcuate inlet gap 12 into the outlet duct 11, the remainder of the periphery having a progressively increasing radius of curvature, in section planes containing the axis of the outlet duct, until the rearmost portion 21 is reached, the formation of this portion being heel-shaped.

Upstream of and following the lip-shaped part 20 of the periphery is a liquid fuel dispersing device in the form of a fuel pipe 22, provided with a row of orifices directed in the upstream direction, and a carburetion gutter 23 into which the jets of fuel discharge and which causes lateral and longitudinal dispersion of the fuel. Some of the dispersed fuel, mixed with air to form a readily combustible mixture, is led into a sheltered region 24 in the lip portion, the walls of this region being free from perforations, by a U-shaped passage formed by the leading edge part of the inner wall 18 of the liner having a doubling plate 25 attached to its inside surface to form a space into which the turned over edge 26 of the outer wall 19 projects. One leg 27 of the U-shaped passage thus formed has its open end immediately downstream of the fuel dispersing means 22, 23 so that it receives a fairly rich mixture of fuel and air, and the other leg 28 directs the mixture into the sheltered region 24, where it burns to form a pilot flame. The remainder of the dispersed fuel is carried through perforations 29 by inflowing air into the liner and burns therein, ignition in the pilot and main combustion regions being initiated by an electrical igniter, not shown, projecting through the casing wall 10 into the liner. The perforations 29 are mainly of straight sided form and have along their downstream edges short deflector flanges 30 directing the inflowing mixture towards the centre of the space within the liner. To divide off a supply of secondary combustion air for admission downstream of the zone of primary combustion, a deflector plate 31 is provided extending upstream from a position part way along the outlet duct portion 16 of the liner to the liner opening 12, which it divides into two parts, the inner part receiving fuel and air mixture and the outer part practically pure air. This pure air passes between the deflector plate 31 and the outer wall 10 of the casing and a greater part of it enters the liner through the perforations downstream of the line of connection of the deflector plate to the liner. A smaller part of the air passes beyond the downstream end of the perforated liner and is used to cool a number of overlapping heat shielding elements 32 which form a continuation of the liner. At each overlap between adjacent elements 32 there is a gap through which some of the air is admitted and flows over the internal surface of the element.

FIGURES 3 to 6 of the drawings relate to the second example.

The perforated liner 50 in this second example is generally similar in shape to the liner 15 in the first example except that the rear part of the upper surface is formed with a deep indentation 51 which is V shaped as seen in the direction of the arrow A, see FIGURE 4. Air and fuel mixture enters through perforations 52 in the top and side surfaces as indicated by the arrows 53, the purpose of the indentation being to bring these surfaces closer together so as to reduce the distance of penetration from the perforations to the centre of the primary combustion zone 54 and thus obtain more rapid burning in this zone.

The wedge-shaped cavity formed between the inner wall 9 of the plenum chamber and the V shaped indentation in the liner is partially filled by a baffle 55, leaving a passage 56 of suitable size and shape for the mixture flowing to the perforations 52 in the upper wall of the liner. The top and side surfaces of the liner are deeply corrugated, the perforations 52 being formed in the troughs of the corrugations. The corrugations and perforations appear in FIGURES 4 and 6; in FIGURE 3 most of them are omitted to avoid confusion of the remainder.

Short deflector flanges 57 are attached along the downstream edges of the perforations and direct the inflowing mixture towards the centre of the combustion zone 54. At its downstream end the liner has a reverse flange 58 by which it is attached to the outlet duct 11, for example by vanes 59. A tertiary air mixing zone 60 is formed by a continuation 61 of the liner in the swivelling pipe bend nozzle 14. The part 61 of the liner is attached to the nozzle by radial pins 62, to allow for expansion and contraction, and has longitudinal corrugations, perforations and deflector flanges generally similar to those of the main part of the liner.

The leading edge 63 of the liner is provided at spaced intervals with conical depressions 64 terminating in openings 65 through which project pilot fuel spray injectors 66 mounted on a manifold 67 extending parallel to the leading edge. Two main fuel manifolds 68 and 69 and an air manifold 70, receiving air from the high pressure compressor, also extend along the leading edge in spaced relation to the manifold 67 as shown more clearly in FIGURE 5. The manifolds 68 and 69 each carry a series of fuel nozzles 71 and the air manifold 70 carries, directed transversely to each such fuel nozzle, an air blast nozzle 72 to disperse the issuing fuel so that it mixes with the air flowing towards the perforations 52 of the liner. Fuel-air mixture thus enters through these perforations and is burnt in the combustion zone 54. There is one set of nozzles 71 and injector 66 for each row of perforations, that is to say for each trough in the corrugation.

For starting purposes a torch igniter 73 is provided at each end of the leading edge and is directed so that the flames extend across the injection directions of the pilot fuel injectors 66. The fuel and electrical connections for the torch igniters are conventional in character and are not shown on the drawings.

We claim:
1. Equipment for burning fluid fuel in a stream of combustion-supporting gas, comprising; a casing including inner and outer walls having front portions which are centered on a primary axis (treated for reference as a fore-and-aft axis) and which define an arcuate-sectioned front entry opening to the casing for receiving gas flow in substantially the same direction as the primary axis, a circular wall which is centered on a secondary axis arranged at a substantial angle to the primary axis, and which defines a circular lateral exit opening from the casing for delivering gas flow in substantially the same direction as the secondary axis, the inner and outer wall being merged at the rear of the casing, and the outer wall having an opening therein, the periphery of which is merged with the circular wall; a perforated liner within the casing, comprising an arcuate lip disposed intermediate the inner and outer arcuate walls, an inner liner wall and an outer liner wall extending rearwards from the lip and generally divergent from one another, and spaced from the inner casing wall and the outer casing wall respectively, and a circular liner wall within and spaced from the circular casing wall, the inner and outer liner walls being merged at the rear of the liner, and the outer liner wall having an opening therein, the periphery of which is merged with the circular liner wall; and elongated arcuate fuel dispersing means forward of and adjacent to the lip.

2. An aircraft jet propulsion power plant including, in fore-and-aft succession, an axial flow low-pressure air compressor, an axial flow high-pressure air compressor, and turbine means drivingly connected to the compressors, the compressors being on a common primary axis; a casing including inner and outer walls having front portions which are centered on the primary axis and which define an arcuate-sectioned front entry to the casing adjacent to and in communication with the rear of the low-pressure compressor, a circular wall portion which is centered on a secondary axis arranged at a substantial angle to the primary axis, and which defines a circular lateral exit opening from the casing for delivering gas flow in substantially the same direction as the secondary axis, the inner and outer walls being merged at the rear of the casing, and the outer wall portion having an opening therein, the periphery of which is merged with the circular wall; a perforated liner within the casing, comprising an arcuate lip disposed intermediate the inner and outer arcuate walls, an inner liner wall and an outer liner wall extending rearwards from the lip and generally divergent from one another, and spaced from the inner casing wall and the outer casing wall respectively, and a circular liner wall within and spaced from the circular casing wall, the inner and outer liner walls being merged at the rear of the liner, and the outer liner wall having an opening therein, the periphery of which is merged with the circular liner wall; elongated arcuate fuel dispersing means forward of and adjacent to the lip; and a rotatable elbow nozzle, and means rotatably mounting the nozzle on the circular wall of the casing, as a prolongation thereof.

3. An aircraft power plant as claimed in claim 2 including means between the inner arcuate wall portion and the primary axis, defining a communication between the two compressors.

4. An aircraft power plant as claimed in claim 2 wherein the inner liner wall is deeply indented in cross section towards the rear end thereof, and including a baffle member, spaced from the inner liner, but filling a substantial portion of the space between the inner liner wall and the inner casing wall.

5. An aircraft power plant as claimed in claim 2 wherein each of the inner and outer liner walls is corrugated, with crests and troughs of the corrugations extending rearwards from adjacent to the lip, and wherein there are perforations in the troughs, whereby the perforations are further than the crests from the adjacent wall portion.

6. An aircraft power plant as claimed in claim 5 wherein there is a series of positions along the lip from each of which a corrugation trough runs rearwards in both the inner and the outer liner walls, and the fuel dispersing means comprises, at each of these positions, a pilot jet for dispersing a pilot supply of fuel into a zone within the lip, and a pair of main jets for dispersing a main supply of fuel into air flowing along the two troughs running from that position.

7. An aircraft power plant according to claim 6 wherein the main jets are directed perpendicularly to the length of the corrugations, and including, associated with each main jet, an air jet adapted to deflect fuel along the associated trough.

8. An aircraft power plant according to claim 2 including a tubular liner member within the elbow nozzle, in prolongation of the circular liner wall.

9. An aircraft power plant according to claim 8 including means mounting the tubular liner member on the elbow nozzle for rotation therewith relative to the circular liner wall.

10. An aircraft jet propulsion power plant as claimed in claim 2, wherein the central portion of the lip is forward of the whole of the circular casing wall, while a straight line between the two extremities of the lip lies aft of the secondary axis.

References Cited by the Examiner

UNITED STATES PATENTS

| | | | |
|---|---|---|---|
| 2,525,206 | 10/50 | Clarke | 60—39.65 |
| 2,699,647 | 1/55 | Goebel | 60—35.6 |
| 2,801,520 | 8/57 | Highberg | 60—39.65 X |
| 2,867,267 | 1/59 | Nerad et al. | 60—39.65 X |
| 2,912,188 | 11/59 | Singelmann et al. | 244—12 |

FOREIGN PATENTS

| | | |
|---|---|---|
| 1,242,564 | 8/60 | France. |
| 851,153 | 10/60 | Great Britain. |
| 861,480 | 2/61 | Great Britain. |

SAMUEL LEVINE, *Primary Examiner.*